United States Patent

Dobinson et al.

Patent Number: 5,025,084
Date of Patent: Jun. 18, 1991

[54] POLYIMIDE-FORMING COMPOSITIONS

[75] Inventors: Bryan Dobinson, Duxford; Mark R. Southcott, Chatteris, both of England

[73] Assignee: Ciba-Geigy Corporation, Ardsley, N.Y.

[21] Appl. No.: 550,429

[22] Filed: Jul. 10, 1990

[30] Foreign Application Priority Data

Jul. 15, 1989 [GB] United Kingdom ............... 8916259

[51] Int. Cl.$^5$ ............................................. C08G 12/00
[52] U.S. Cl. ........................................ 528/229; 528/222; 528/226; 528/227; 528/272; 528/299; 528/303; 528/308; 528/332; 528/351; 528/352; 528/354; 427/370
[58] Field of Search ............... 528/229, 222, 226, 227, 528/272, 299, 302, 308, 332, 351, 352, 354; 427/370

[56] References Cited

U.S. PATENT DOCUMENTS

| | | | |
|---|---|---|---|
| 3,179,634 | 4/1965 | Edwards | 428/379 |
| 3,528,950 | 9/1970 | Lubowitz | 528/229 |
| 3,575,924 | 4/1971 | Lyon | 525/426 |
| 3,671,490 | 6/1972 | Bargain | 528/128 |
| 3,745,149 | 7/1973 | Serafini et al. | 528/288 |
| 4,166,170 | 8/1979 | St. Clair | 528/229 |
| 4,197,339 | 4/1980 | Paul et al. | 427/370 |
| 4,233,258 | 11/1980 | St. Clair | 264/137 |
| 4,338,430 | 7/1982 | Edelman | 528/222 |
| 4,495,339 | 1/1985 | Lauver | 526/262 |
| 4,497,939 | 2/1985 | Lauver | 526/262 |
| 4,497,948 | 2/1985 | Lauver | 528/342 |

Primary Examiner—Morton Foelak
Assistant Examiner—Sam A. Acquah
Attorney, Agent, or Firm—Luther A. R. Hall

[57] ABSTRACT

A polyimide-forming composition comprising
(A) a polycarboxylic acid partial ester of formula $$HOOC-R^1-COOR^2 \qquad I$$

where $R^1$ denotes a divalent ethylenically unsaturated aliphatic or cycloaliphatic group of 2 to 20 carbon atoms, and $R^2$ denotes the residue, after removal of a hydroxyl group, of an alcohol having from 4 to 20 carbon atoms which has a cycloaliphatic, aromatic or heterocyclic ring and is polymerizable on heating in the presence of an acid,
(B) a partial ester of formula I above in which $R^1$ denotes a group of formula II

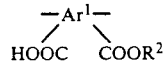

where $Ar^1$ denotes a tetravalent aromatic group of 6 to 20 carbon atoms linked through aromatic carbon atoms thereof to the indicated carbon atoms, and $R^2$ is as defined above,
(C) an aromatic primary polyamine and
(D) a heat-activable substance which releases an acid at a temperature of 100° C. or above.

22 Claims, No Drawings

POLYIMIDE-FORMING COMPOSITIONS

This invention relates to polyimide-forming compositions containing partial esters of polycarboxylic acids together with aromatic polyamines and cured products obtained from such compositions.

Polyimide resins have high thermal stability and high strength at elevated temperatures, properties which make them useful as matrix resins in carbon fibre reinforced composites and other fibre reinforced composites. U.S. Pat. Nos. 3,745,149, 4,166,170, 4,197,339, 4,233,258, 4,338,430, 4,495,339, 4,497,939 and 4,497,948 describe polyimide-forming compositions comprising a monoalkyl ester of maleic acid or nadic acid, a dialkyl ester of an aromatic tetracarboxylic acid and an aromatic primary diamine and the use of such compositions in the production of cured fibre-reinforced composites. It has proved a longstanding problem to produce cured composites having an acceptable level of voids from polyimide-forming compositions described in the abovementioned U.S. patents. There is a need, therefore, for polyimide-forming compositions and, in particular for carboxylic acid partial ester components of such compositions, which can facilitate the production of cured fibre-reinforced composites having a low void content together with good thermal properties.

Accordingly, the present invention provides a polyimide-forming composition comprising (A) a polycarboxylic acid partial ester of formula $$\text{HOOC—R}^1\text{—COOR}^2 \qquad \text{I}$$

where

R$^1$ denotes a divalent ethylenically unsaturated aliphatic or cycloaliphatic group of 2 to 20 carbon atoms and R$^2$ denotes the residue, after removal of the hydroxyl group, of an alcohol having from 4 to 20 carbon atoms which has a cycloaliphatic, aromatic or heterocyclic ring and is polymerisable on heating in the presence of an acid;

(B) a partial ester of formula I above in which R$^1$ denotes a group of formula II

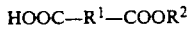

where Ar$^1$ denotes a tetravalent aromatic group of 6 to 20 carbon atoms linked through aromatic carbon atoms thereof to the indicated carbon atom and R$^2$ is as defined above;

(C) an aromatic primary polyamine; and (D) a heat-activatable substance which releases an acid on heating to a temperature of 100° C. or above.

In formula I, when R$^1$ denotes an unsaturated aliphatic or cycloaliphatic group it is generally an alkenylene or cycloalkenylene group. Thus R$^1$ may be, for example, a cyclohexenylene group, i.e. the ester of formula I may be a monoester of a cyclohexene dicarboxylic acid. Preferably, when R$^1$ denotes an unsaturated group it denotes a group of formula $$-C(R^3)=C(R^3)- \qquad \text{III}$$

or

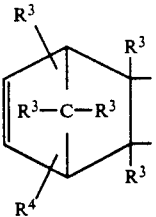

where

R$^3$ denotes a hydrogen atom or an alkyl group of 1 to 4 carbon atoms, and

R$^4$ denotes a hydrogen atom, an alkyl group of 1 to 4 carbon atoms, an allyl group or a methallyl group.

Thus the partial ester (A) may be a monoester of maleic acid, citraconic acid, dimethylmaleic acid, ethylmaleic acid, diethylmaleic acid, propylmaleic acid, bicyclo[2.2.1]hept-5-ene-2,3-dicarboxylic acid, allyl bicyclo[2.2.1]hept-5-ene-2,3-dicarboxylic acid, methallylbicyclo[2.2.1]hept-5-ene-2,3-dicarboxylic acid, methylbicyclo[2.2.1]hept-5-ene-2,3-dicarboxylic acid, allylmethylbicyclo[2.2.1]hept-5-ene-2,3-dicarboxylic acid or methallylmethylbicyclo[2.2.1]hept-5-ene-2,3-dicarboxylic acid. In especially preferred embodiments where R$^1$ denotes an unsaturated group, it denotes a group of formula III where R$^3$ denotes a hydrogen atom or a group of formula IV where R$^3$ denotes a hydrogen atom and R$^4$ denotes a hydrogen atom or an allyl group. Thus such especially preferred esters are monoesters of maleic acid, bicyclo[2.2.1]hept-5-ene-2,3-dicarboxylic and allylbicyclo[2.2.1]hept-5-ene-2,3-dicarboxylic acid.

When R$^1$ in formula I denotes a group of formula II, it effectively denotes a group in which Ar$^1$ is the residue, after removal of 4 carboxyl groups, of an aromatic tetracarboxylic acid. Therefore, the partial ester (B) is a diester of an aromatic tetracarboxylic acid. The group Ar$^1$ may be, for example, the residue, after removal of four carboxyl groups, of a napthalene tetracarboxylic acid such as 2,3,6,7-napthalene tetracarboxylic acid, 1,2,5,6-napthalene tetracarboxylic acid, or 1,4,5,8-napththalene tetracarboxylic acid, of a bis(dicarboxyphenyl)sulphone, such as bis(3,4-dicarboxyphenyl)sulphone, or of a diphenyl tetracarboxylic acid such as 2,2',3,3'-diphenyl tetracarboxylic acid. Preferably, Ar$^1$ denotes the residue, after removal of four carboxyl groups, of a benzophenone tetracarboxylic acid, especially 3,3',4,4'-benzophenone tetracarboxylic acid, or of a benzene tetracarboxylic acid, especially pyromellitic acid, or of a bis(dicarboxyphenyl)alkane, especially bis(3,4-dicarboxyphenyl)methane.

The group R$^2$ in formula I denotes the residue, after removal of an alcoholic hydroxyl group, of an alcohol containing a cycloaliphatic, aromatic or heterocyclic ring which polymerises when heated, particularly under pressure, in the presence of an acid. Many alcohols containing a ring as specified are known to polymerise under such conditions. The suitability of other alcohols can readily be determined by heating them in an autoclave in the presence of a substance which releases an acid on heating at an elevated temperature, usually 100° C. or above, and determining whether polymerisation to a solid material has taken place. R$^2$ is generally the residue, after removal of an alcoholic hydroxyl group, of an alcohol as specified which has a methylol group attached to the ring either directly or through an ethenylene group.

Preferably, $R^2$ denotes the residue, after removal of an alcoholic hydroxyl group, of an alcohol of formula $$R^5CH_2OH \qquad V$$

where $R^5$ denotes a monovalent aromatic group of 6 to 15 carbon atoms, linked through an aromatic carbon atom thereof to the indicated carbon atom, or a monovalent heterocyclic group having a nitrogen, oxygen or sulphur hetero atom, having 4 to 6 atoms in the ring and having a ring carbon atom thereof attached to the indicated carbon atom, or a monovalent ethylenically unsaturated cycloaliphatic group of 5 to 15 carbon atoms having a ring carbon atom thereof attached to the indicated carbon atom, or a group of formula $$-CH=C(R^6)R^7 \qquad VI$$

where either $R^6$ denotes a hydrogen atom and $R^7$ denotes a monovalent aromatic group of 6 to 15 carbon atoms having an aromatic carbon atom attached to the indicated carbon atom, or $R^6$ and $R^7$ together with the carbon atom to which they are attached denote a divalent cycloaliphatic group of 5 to 15 carbon atoms.

In formula V, $R^5$ as a monovalent aromatic group may denote a phenyl group or a naphthlyl group, either of which may be unsubstituted or substituted by one or more substituents selected from $C_1$-$C_{12}$ alkyl groups, $C_1$-$C_{12}$ alkoxy groups, hydroxyl groups, halogen atoms or nitro groups. Preferably, $R^5$ as a monovalent aromatic group denotes a phenyl group which is unsubstituted or substituted by $C_1$-$C_4$ alkyl, $C_1$-$C_4$ alkoxy, hydroxyl, halogen or nitro, while in especially preferred embodiments $R^5$ denotes a phenyl group which is unsubstituted or substituted by two methoxy groups, or by one methoxy and one hydroxyl group, or by one chlorine atom or one nitro group.

$R^5$ as a monovalent heterocyclic group may have one or more hetero atoms in the ring, may be saturated or unsaturated and may be unsubstituted or substituted by one or more substituents selected from $C_1$-$C_{12}$ alkyl groups, $C_1$-$C_{12}$ alkoxy groups, hydroxyl groups or halogen atoms. Preferably, $R^5$ as a monovalent heterocyclic group denotes a group having one oxygen atom and 3 to 5 carbon atoms in the ring, or a group having one sulphur atom and 4 carbon atoms in the ring, or a group having one nitrogen atom and 5 carbon atoms in the ring. Especially preferred groups $R^5$ include oxetanyl, furyl, dihydropyranyl, thiophenyl and pyridinyl groups.

When $R^5$ in formula V denotes a monovalent ethylenically unsaturated cycloaliphatic group, it may contain one or more rings and one or more ethylenic double bonds. Preferably, $R^5$ as a monovalent unsaturated cycloaliphatic group denotes a cycloalkenyl group having 5 to 10 carbon atoms, for example a cyclopentenyl or cyclohexenyl group, while in especially preferred embodiments $R^5$ denotes a bicycloheptenyl group.

When $R^5$ denotes a group of formula VI in which $R^6$ denotes a hydrogen atom and $R^7$ denotes a monovalent aromatic group, $R^7$ may be selected from any of the groups hereinbefore specified for $R^5$ as a monovalent aromatic group, with aromatic groups of 6 to 10 carbon atoms being preferred. In an especially preferred embodiment, $R^7$ denotes a phenyl group, i.e. $R^5$ denotes a cinnamyl group.

In embodiments of the invention where $R^5$ denotes a group of formula VI in which $R^6$ and $R^7$ together with the carbon atom to which they are attached denote a divalent cycloaliphatic group, the latter may have one or two rings and is preferably a saturated group having 5 to 10 carbon atoms, for example a cyclopentylidene, cyclohexylidene or bicycloheptylidene group, the last-named being especially preferred.

Partial esters of formula I where $R^1$ denotes a divalent ethylenically unsaturated group may be prepared by reacting a dicarboxylic acid anhydride of formula

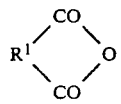
$$\qquad VII$$

with an alcohol of formula $$R^2OH \qquad VIII$$

where $R^2$ is as hereinbefore defined, using known procedures for anhydride-alcohol reactions.

Partial esters of formula I where $R^1$ denotes a group of formula II may be prepared by reacting a tetracarboxylic acid dianhydride of formula

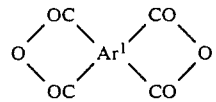
$$\qquad IX$$

where $Ar^1$ is as hereinbefore defined, with an alcohol of formula VIII using known procedures for anhydride-alcohol reactions.

In the reaction of the alcohol of formula VIII with the anhydride of formula VII or IX, the reactants are usually heated together in an inert solvent in the presence of a tertiary amine as catalyst. It will be understood that the reaction can sometimes lead to different isomers, depending on which carboxyl group(s) in the product is (are) esterified and which is (are) free. In practice one isomer usually predominates. For example, in products derived from 3,3',4,4'-benzophenone tetracarboxylic acid dianhydride, the isomer with the —$COOR^2$ groups in the 2,2' positions usually predominates, while in products derived from pyromellitic acid dianhydride, the isomer with the —$COOR^2$ groups in the 1,5 positions usually predominates. Since the mixture of isomers generally obtained can be used in polyimide-forming compositions, there is no need to isolate individual isomers.

Specific especially preferred partial esters of formula I are those hereinafter described in the Examples.

The aromatic ring in the polyamine (C) may be carbocyclic or heterocyclic. The polyamine (C) generally has two or three primary amine groups or is an aniline-formaldehyde condensate having more than three primary amine groups. Preferred classes of polyamine include phenylenediamines, diaminopyridines, phenylindanediamines, diaminoxanthenes, aniline-formaldehyde condensates having three or more primary amine groups, and diamines of formula $$H_2N-Ar^2-X-Ar^2-NH_2 \qquad X$$

where $Ar^2$ denotes a phenylene group and

X denotes an alkylene group of 1 to 4 carbon atoms, an oxygen atom or a carbonyl or sulphonyl group.

Preferred specific polyamines include p-phenylenediamine, 2,6-diaminopyridine, 1,3,3-trimethyl-1-(4-aminophenyl)-5-aminoindane, 1,3,3-trimethyl-1-(4-aminophenyl)-6-aminoindane, 2,7-diaminoxanthene dioxide, bis(4-aminophenyl)methane, bis(4-aminophenyl)ether, bis(4-aminophenyl)sulphone, bis(4-aminophenyl)ketone, 3-(4-aminobenzyl)-4,4'-diaminodiphenylmethane or an aniline-formaldehyde condensation residue, i.e. the residue left after separation of bis(4-aminophenyl)methane.

The heat-activatable acid-releasing substance (D) is a substance which remains latent, at temperatures below 100° C. but which when heated to temperatures of 100° C. or above releases an acid. Such latent acid-releasing substances are well-known and include boron difluoride chelates, aluminium dichloride chelates and, preferably, boron trifluoride complexes. Suitable chelates of boron difluoride and aluminium dichloride include those described in U.S. Pat. No. 3,424,699. Suitable boron trifluoride complexes include those with triaryl phosphines such as triphenyl phosphine and, preferably, complexes with amines, which may be primary, secondary or tertiary monoamines or polyamines and can be N-heterocycles, amine-substituted heterocycles, aliphatic, cycloaliphatic or araliphatic. Examples of boron trifluoride-amine complexes are those with pyridine, piperidine, mono-, di- and tri-ethylamine, mono-, di- and trimethylamine, isophoronediamine, cyclohexylamine, benzylamine, 2,3,3-trimethylhexamethylenediamine, 2,4,4-trimethylhexamethylenediamine and N,N,N',N'-tetramethylhexamethylenediamine. Amongst the boron trifluoride-amine complexes, those with primary amines are preferred, the complex with ethylamine being especially preferred.

In the polyimide-forming compositions of the invention, the reactants (A), (B) and (C) may be used in molar ratios (A):(B):(C) within the range 1:0.7–1.3:1.2–1.8 respectively. Preferred molar ratios (A):(B):(C) are within the range 1:0.9–1.1:1.4–1.6.

The polyimide-forming compositions of the invention are particularly useful when they also contain a fibrous reinforcing material, especially when the compositions are in form of prepregs. Such fibre-reinforced compositions can be used to produce cured fibre-reinforced composites having high thermal stability, high strength at elevated temperatures and low void content.

The fibrous reinforcing material may be in the form of woven or nonwoven cloth, unidirectional lengths or chopped strands of glass, carbon, boron, stainless steel, tungsten, alumina, silicon carbide, asbestos or an aromatic polyamide. The invention is particularly useful where carbon fibre is used as the reinforcing material.

A prepreg may be formed by bringing together a film of the polyimide-forming composition and the fibrous reinforcing material under temperature and pressure conditions such that the film flows about the fibrous material to form a coherent structure. More usually, the fibrous material is impregnated with a solution of the polyimide-forming composition in an organic solvent and the solvent is evaporated to form a prepreg. Suitable solvents include alcohols such as methanol, ethanol, isopropanol, 2-butoxyethanol and diethyleneglycol monobutyl ether, ketones such as acetone, methyl ethyl ketone and methyl isobutyl ketone, and hydrocarbons such as toluene and xylene.

Cured fibre-reinforced composites can be produced using conventional techniques. Thus where the fibre-reinforced composition of the invention is a prepreg, one or more layers of the prepreg, optionally together with one or more other heat-curable resinous layer and/or one or more reinforcing fibrous layers, may be moulded using conventional moulding techniques at conventional curing temperatures and pressures for unsaturated end-capped polyimides, such as those described in the abovementioned U.S. patents.

Compositions of the invention, including fibre-reinforced compositions, may be cured by heating to elevated temperatures, such as those conventionally used in producing cured unsaturated end-capped polyimides. Thus, the heating may be carried out in two stages: firstly at 120°–220° C., preferably 180°–220° C., to effect polyimide formation, and then at 250° C. or above, preferably 280°–350° C., to effect crosslinking through the unsaturated groups derived from the end-capping partial ester (A).

The invention is illustrated by the following Examples, in which parts and percentages are by weight unless stated otherwise.

EXAMPLE 1

Preparation of Monobenzyl Ester of Bicyclo[2.2.1]hept-5-ene-2,3-dicarboxylic Acid To bicyclo[2.2.1]hept-5-ene-2,3-dicarboxylic acid anhydride (164 g) is added dry methyl ethyl ketone (250 ml), benzyl alcohol (108 g) and N,N-dimethylbenzylamine (2.7 g). The mixture is heated under nitrogen to 80° C. and stirred for 4 hours at this temperature. The solvent is removed from the resulting mixture under vacuum and recrystallisation of the residue from toluene gives an 80% yield (219.2 g) of the required ester m.p. 110°–112° C. Analysis: Found: C,70.4; H,6.0%; $C_{16}H_{16}O_4$ requires: C,70.1; H,6.5%. IR (KBr disc): 3200–3600 cm$^{-1}$ (broad OH); 1740 cm$^{-1}$; 1700 cm$^{-1}$. NMR (DMSO-d$_6$): 1.3(s-2H); 3.05(s-2H); 3.3–3.4(m-4H); 6.1–6.15(d-2H); 6.5–7.6 (broad s-1H); 7.35(s-5H)δ.

EXAMPLE 2

Preparation of Monofurfuryl Ester of Bicyclo[2.2.1]hept-5-ene-2,3-dicarboxylic Acid The reaction procedure described in Example 1 is repeated using furfuryl alcohol (98 g) in place of benzyl alcohol. Recrystallisation from cyclohexane gives a 80% yield (209.6 g) of a white crystalline solid, m.p. 91°–92° C. Analysis: Found: C,63.9; H,5.4%; $C_{14}H_{14}O_5$ requires: C,64.1; H,5.3%. IR (KBr disc): 3300–2500 cm$^{-1}$ (broad OH); 1730 cm$^{-1}$; 1700 cm$^{-1}$. NMR (CDCl$_3$): 1.2–1.6(m-2H); 3.2–3.3(m-4H); 4.9–5.0(d-2H); 6.2–6.4(m-5H); 8.5–9.2 (broad s-1H)δ.

EXAMPLE 3

Preparation of Mono-3-methyl-3-oxetanylmethyl Ester of Bicyclo[2.2.1]-hept-5-ene-2,3-dicarboxylic Acid The reaction procedure described in Example 1 is repeated, replacing the benzyl alcohol by 3-methyl-3-oxetanemethanol (102 g). Recrystallisation from toluene gives a 51% yield (135.6 g) of a white crystalline solid, m.p. 114°–115° C. Analysis: Found: C,63.3; H,6.9%; $C_{14}H_{17}O_5$ requires: C,63.2; H,6.8%. IR (KBr disc): 2500–3400 cm$^{-1}$ (broad OH); 1735 cm$^{-1}$; 1700 cm$^{-1}$. NMR (CDCl$_3$): 1.3–1.4(m-5H); 3.2–3.3(m-4H); 4.05(s-2H); 4.3–4.6(q-4H); 6.2–6.25(d-2H)δ.

EXAMPLE 4

Preparation of Mono-3,4-dihydro-2H-pyranyl-2-methyl Ester of Bicyclo[2.2.1]hept-5-ene-2,3-dicarboxylic Acid To bicyclo[2.2.1]hept-5-ene-2,3-dicarboxylic acid anhydride (164 g) is added 3,4-dihydro-2H-pyran-2-methanol (114 g), N,N-dimethylbenzylamine (2.8 g) and dry N,N-dimethylformamide (250 ml). The mixture is heated under nitrogen to 80° C. and stirred for 1 hour at this temperature. Removal of the solvent from the resulting mixture under vacuum gives a gum which is shown by titration against sodium hydroxide to have 70% purity. IR (thin film): 2500–3400 cm$^{-1}$ (broad OH); 1735 cm$^{-1}$; 1700 cm$^{-1}$.

EXAMPLE 5

Preparation of Monocinnamyl Ester of Bicyclo[2.2.1]hept-5-ene-2,3-dicarboxylic Acid The reaction procedure described in Example 1 is repeated, replacing the benzyl alcohol by cinnamyl alcohol (134 g). Recrystallisation from cyclohexane gives a 98% yield (292.1 g) of white crystalline solid, m.p. 94°–95° C. Analysis: Found: C,72.5; H,6.2%; $C_{18}H_{18}O_4$ requires: C,72.5; H,6.0%. IR (KBr disc): 2400–3200 cm$^{-1}$ (broad OH); 1730 cm$^{-1}$; 1700 cm$^{-1}$. NMR (CDCl$_3$): 2.4–2.5 (m-2H); 3.2–3.4 (m-4H); 4.6–4.7 (m-2H); 4.0–4.5 (s-1H); 6.0–6.8 (m-4H); 7.3–7.4 (m-5H)δ.

EXAMPLE 6

Preparation of Mono-Bicyclo[2.2.1]hept-5-enyl-2-methyl Ester of Bicyclo[2.2.1]hept-5-ene-2,3-dicarboxylic Acid The reaction procedure described in Example 1 is repeated, replacing the benzyl alcohol by 5-norbornene-2-methanol (124 g). Recrystallisation from toluene gives a 74% yield (212.4 g) of a white crystalline solid, m.p. 144°–145° C. Analysis: Found: C,71.0; H,7.1%; $C_{17}H_{20}O_4$ requires: C,71.0; H,6.7%. IR (KBr disc): 2500–3300 cm$^{-1}$ (broad OH); 1730 cm$^{-1}$; 1700 cm$^{-1}$. NMR (CDCl$_3$): 1.3–1.5 (m-4H); 2.8(s-2H); 3.2–3.8 (m-10H); 5.8–6.4 (m-4H)δ.

EXAMPLE 7

Preparation of Mono-2-[3-(2,2-dimethylbicyclo[2.2.1]heptylidene)ethyl] Ester of Bicyclo[2.2.1]hept-5-ene-2,3-dicarboxylic Acid The reaction procedure described in Example 1 is repeated, replacing the benzyl alcohol by 2,2-dimethyl-3-(2-hydroxyethylidene)bicyclo[2.2.1]heptane (184 g). Recrystallisation from cyclohexane gives 60% yield (198 g) of a white crystalline solid, m.p. 110°–111° C. Analysis: Found: C,71.9; H,7.9%; $C_{20}H_{26}O_4$ requires: C,72.7; H,7.9%. IR (KBr disc): 2500–3500 cm$^{-1}$ (broad OH); 1730 cm$^{-1}$; 1700 cm$^{-1}$. NMR (CDCl$_3$): 1.0–1.9 (m-16H); 2.95–3.3 (m-4H); 4.35–4.55 (m-2H); 4.9–5.2 (t-1H); 6.25(s-2H); 6.0–7.0 (s-1H)δ.

EXAMPLE 8

Preparation of Mono-2,5-dimethoxybenzyl Ester of Bicyclo[2.2.1]-hept-5-ene-2,3-dicarboxylic Acid The reaction procedure described in Example 1 is repeated, replacing the benzyl alcohol by 2,5-dimethoxybenzyl alcohol (168 g). Recrystallisation from toluene gives a 95% yield (315.4 g) of a white crystalline solid, m.p. 133°–134° C. Analysis: Found: C,65.0; H,6.0%; $C_{18}H_{20}O_6$ requires: C,65.0; H,6.0%. IR (KBr disc): 2500–3400 cm$^{-1}$ (broad OH); 1730 cm$^{-1}$; 1700 cm$^{-1}$. NMR (CDCl$_3$): 1.3–1.5 (m-2H); 3.2–3.5 (d-4H); 3.8 (s-6H); 4.8–5.3 (q-2H); 6.25 (s-2H); 6.8–6.9 (d-3H); 7.9–8.5 (s-1H)δ.

EXAMPLE 9

Preparation of Mono-2-nitrobenzyl Ester of Bicyclo[2.2.1]hept-5-ene-2,3-dicarboxylic Acid The reaction procedure described in Example 1 is repeated, replacing the benzyl alcohol by 2-nitrobenzyl alcohol (153 g). Recrystallisation from toluene gives a 87% yield (275.8 g) of a white crystalline solid, m.p. 140°–141° C. Analysis: Found: C,60.4, H,4.8; N,4.4%; $C_{16}H_{15}NO_6$ requires: C,60.5; H,4.7; N,4.4%, IR (KBr disc): 2500–3200 cm$^{-1}$ (broad OH); 1735 cm$^{-1}$; 1705 cm$^{-1}$. NMR (CDCl$_3$): 1.4–1.5 (m-2H); 3.2–3.25 (m-4H); 5.35–5.45 (d-2H); 5.0–6.5 (s-1H); 6.2(s-2H); 7.2–8.1 (m-4H)δ.

EXAMPLE 10

Preparation of Mono-2-chlorobenzyl Ester of Bicyclo[2.2.1]hept-5-ene-2,3-dicarboxylic Acid The reaction procedure described in Example 1 is repeated, replacing the benzyl alcohol by 2-chlorobenzyl alcohol (143 g). Recrystallisation from cyclohexane/toluene gives a 86% yield (263.6 g) of a white crystalline solid, m.p. 115°–116° C. Analysis: Found: C,61.6; H,4.8%; $C_{16}H_{15}ClO_4$ requires: C,62.2; H,4.9%. IR (KBr disc): 2300–3200 cm$^{-1}$ (broad OH); 1740 cm$^{-1}$; 1710 cm$^{-1}$. NMR (CDCl$_3$): 1.4–1.5 (m-2H); 3.2–3.3 (m-4H); 5.1–5.2 (d-2H); 6.25 (s-2H); 7.2–7.3 (m-4H); 9.6 (s-1H)δ.

EXAMPLE 11

Preparation of Mono-4-hydroxy-3-methoxybenzyl Ester of Bicyclo-[2.2.1]hept-5-ene-2,3-dicarboxylic Acid The reaction procedure described in Example 1 is repeated, replacing the benzyl alcohol by 4-hydroxy-3-methoxybenzyl alcohol (154 g). Recrystallisation from toluene/chloroform gives a 81% yield (257.6 g) of a white crystalline solid, m.p. 156°–157° C. Analysis: Found: C,64.6; H,5.1%; $C_{17}H_{18}O_6$ requires: C,64.2; H,5.6%. IR (KBr disc): 2500–3500 cm$^{-1}$ (broad OH); 1735 cm$^{-1}$; 1705 cm$^{-1}$. NMR (CDCl$_3$): 1.5–1.7 (m-2H); 3.3–3.6 (m-4H); 3.9 (s-3H); 5.7 (s-1H); 6.3 (s-2H); 6.3 (s-2H); 7.0–7.1 (m-3H); 6.5–7.5 (s-1H)δ.

EXAMPLE 12

Preparation of Mono-2-pyridylmethyl Ester of Bicyclo[2.2.1]hept-5-ene-2,3-dicarboxylic Acid The reaction procedure described in Example 1 is repeated, replacing the benzyl alcohol by 2-methylolpyridine (109 g). Recrystallisation from ethanol gives a 88% yield (279.8 g) of a white crystalline zwitterion, m.p. 145°–146° C. Analysis: Found: C,67.0; H,5.5; N,5.1%. $C_{15}H_{15}NO_4$ requires: C,66.0; H,5.5; N,5.1%. IR (KBr disc): 2100–3200 cm$^{-1}$ (broad NH$^+$, O$^-$ salt bands); 1735 cm$^{-1}$; 1700 cm$^{-1}$. NMR (DMSO-d$_6$); 1.3 (2-SH); 2.5 (s-1H); 3.1–3.4 (m-4H); 5.0 (d-2H); 6.1–6.2 (m-2H); 7.2–7.9 (m-3H); 8.4–8.5 (m-1H)δ.

EXAMPLE 13

Preparation of Mono-2-thiophenylmethyl Ester of Bicyclo[2.2.1]-hept-5-ene-2,3-dicarboxylic Acid The reaction procedure described in Example 1 is repeated, replacing the benzyl alcohol by 2-methylol thiophene (114 g). Recrystallisation from toluene gives a 99% yield (275.2 g) of a white crystalline solid, m.p. 117°–118° C. Analysis: Found: C,61.0; H,5.1%; $C_{14}H_{14}O_4S$ requires: C,60.4; H,5.0%. IR (KBr disc): 2500–3500 $cm^{-1}$ (broad OH); 1730 $cm^{-1}$; 1695 $cm^{-1}$. NMR ($CDCl_3$): 1.3–1.4 (m-2H); 3.2–3.4 (m-4H), 5.1–5.2 (d-2H); 6.2 (s-2H); 6.8–7.2 (m-3H); 9.5–10.2 (s-1H)δ.

EXAMPLE 14

Preparation of Monobenzyl Maleate

To maleic anhydride (98 g; 1 mole) is added benzyl alcohol (108 g; 1 mole), N,N-dimethylbenzylamine (2.1 g) and dry methyl ethyl ketone (250 ml). The mixture is heated to 80° C. and stirred for 4 hours at this temperature. The ketone solvent is removed from the resulting mixture under vacuum and the solid residue is recrystallised from toluene to give 95% yield (195.7 g) of the ester, m.p. 55°–56° C. Analysis: Found: C,65.4; H,4.9%; $C_{11}H_{10}O_4$ requires C,64.1; H,4.8%. IR (KBr disc): 2300–3200 $cm^{-1}$ (broad OH); 1720 $cm^{-1}$, 1690 $cm^{-1}$. NMR ($CDCl_3$): 5.3 (s-2H): 6.4 (s-2H); 7.25–7.4 (m-5H); 8.0–8.6 (s-1H)δ.

EXAMPLE 15

Preparation of 5(6)-Allylbicyclo[2.2.1]hept-5-ene-2,3-dicarboxylic Acid Monobenzyl Ester To 5(6)-allylbicyclo[2.2.1]hept-5-ene-2,3-dicarboxylic acid anhydride (206 g) is added benzyl alcohol (108 g), N,N-dimethylbenzylamine (3.1 g) and dry methyl ethyl ketone (250 ml). The mixture is heated to 80° C. and stirred for 4 hours at temperature. The solvent is removed from the resulting mixture under vacuum and the brown liquid residue is purified by distillation, giving a 90% yield (280.8 g) of the ester, b.p. 150° C. at 0.05 mmHg. Analysis: Found: C,72.4; H,7.2%; $C_{19}H_{20}O_4$ requires: C,73.0; H,6.4%. IR (thin film): 2900–3600 $cm^{-1}$ (broad OH); 1710–1740$^{-1}$ (C=O ester and acid). NMR ($CDCl_3$): 1.3 (s-2H); 3.35–3.4 (s-4H); 3.5 (s-2H); 3.7 (d-2H); 5.1 (d-2H); 6.2–6.25 (m-1H); 6.4 (s-1H); 7.3 (s-5H); 8.4–9.5 (s-1H)δ.

EXAMPLE 16

Preparation of Dibenzyl Esters of 3,3',4,4'-Benzophenonetetracarboxylic Acid To 3,3',4,4'-benzophenonetetracarboxylic acid dianhydride (333 g, 1 mole) is added dry methyl ethyl ketone (250 ml), N,N-dimethylbenzylamine (5.5 g) and benzyl alcohol (216 g, 2 moles). The mixture is heated to 80° C. and stirred at this temperature for 4 hours. The solvent is then removed under vacuum to give a 99% yield (533.6 g) of a thick brown gum having a purity (determined by titration against sodium hydroxide) of 98.8%. IR (KBr disc): 2200–3600 $cm^{-1}$ (broad OH); 1660–1750 $cm^{-1}$ (C=O ester, acid, ketone). NMR (DMSO-$d_6$): 5.3 (s-4H); 6.1–6.6 (m-6H); 7.0–8.3 (broad s-2H); 7.5–8.3 (M-16H)δ.

EXAMPLE 17

Preparation of Difurfuryl esters of 3,3',4,4'-Benzophenonetetracarboxylic Acid The reaction procedure described in Example 16 is repeated, replacing the benzyl alcohol by furfuryl alcohol (196 g). A gum is obtained in 98% yield (507.6 g); this has a purity (determined by titration with sodium hydroxide) of 98.3%. IR (squash): 2200–3600 $cm^{-1}$ (broad OH); 1730 $cm^{-1}$; 1670 $cm^{-1}$; 1645 $cm^{-1}$. NMR (DMSO-$d_6$): 5.3 (s-4H); 6.1–6.6 (m-6H); 7.0–8.3 (broad s-2H); 7.5–8.3 m-16)δ.

EXAMPLE 18

Preparation of Di-3-methyl-3-oxetanylmethyl Esters of 3,3',4,4'-Benzophenonetetracarboxylic Acid The reaction procedure described in Example 16 is repeated, replacing the benzyl alcohol by 3-methyl-3-methyloloxetane (228 g). A gum is obtained in 97% yield (510.2 g); this has a purity (determined by titration against sodium hydroxide) of 97.7%. IR (KBr disc): 2300–3600 $cm^{-1}$ (broad OH); 1640–1760 $cm^{-1}$ (C=O ester, acid, ketone). NMR (DMSO-$d_6$): 1.3 (s-6H); 4.3–4.6 (m-8H); 5.35 (s-4H); 7.3–8.3 (m-16H); 7.0–8.6 (broad s-2H)δ.

EXAMPLE 19

Preparation of Di-3,4-dihydro-2H-pyranyl-2-methyl Esters of 3,3',4,4'-Benzophenonetetracarboxylic Acid To 3,3',4,4'-benzophenonetetracarboxylic acid dianhydride (333 g) is added dry methyl ethyl ketone (250 ml). The solution is heated to 70° C. and a solution of 3,4-dihydro-2H-pyran-2-methanol (228 g), N,N-dimethylbenzylamine (5.6 g) and triethylamine (101 g, 1 mole) is added dropwise with stirring. After the addition the mixture is stirred at 70° C. for a further 2 hours. The pH of the resulting mixture is reduced to 7 by addition of aqueous 20% hydrochloric acid, the solution is filtered and the filtrate evaporated under vacuum to leave a 99% yield (544.5 g) of a brown gum. This has a purity (determined by titration against sodium hydroxide) of 80%. IR (thin film): 2200–3600 $cm^{-1}$ (broad OH); 1660–1750 $cm^{-1}$ (C=O ester, acid, ketone).

EXAMPLE 20

Preparation of Dicinnamyl Esters of 3,3',4,4'-Benzophenonetetracarboxylic Acid The reaction procedure of Example 16 is repeated, replacing the benzyl alcohol by cinnamyl alcohol (268 g). The brown gum is isolated in 98% yield (578.2 g) and has a purity (determined by titration against sodium hydroxide) of 99.4%. IR (squash): 2200–3600 $cm^{-1}$ (broad OH); 1660–1750 $cm^{-1}$ (C=O ester, acid, ketone). NMR (DMSO-$d_6$): 4.6–4.8 (m-4H); 6.2–6.4 (m-4H); 5.5–8.1 (broad s-2H); 7.3–8.2 (m-16H)δ.

EXAMPLE 21

Preparation of Di-bicyclo[2.2.1]hept-5-enyl-2-methyl Esters of 3,3',4,4'-Benzophenonetetracarboxylic Acid The reaction procedure of Example 16 is repeated, replacing the benzyl alcohol by bicyclo[2.2.1]hept-5-ene-2-methanol (248 g). The brown gum is isolated in 99% yield (562.3 g) and has a purity (determined by titration against sodium hydroxide) of 98.6%. IR (squash): 2300–3500 $cm^{-1}$ (broad OH); 1660–1750 $cm^{-1}$ (C=O ester, acid, ketone). NMR (DMSO-$d_6$):

1.3–1.5 (m-4H); 2.8 (s-4H); 3.2–3.8 (m-10H); 5.8–6.4 (m-4H); 5.6–7.8 (broad s-2H); 7.6–8.0 (m-6H)δ.

EXAMPLE 22

Preparation of Di(2[3-(2,2-dimethylbicyclo[2.2.1]heptylidene)ethyl) Ester of 3,3′,4,4′-Benzophenonetetracarboxylic Acid The reaction procedure of Example 16 is repeated, replacing the benzyl alcohol by 2,2-dimethyl-3-(2-hydroxyethylidene)bicyclo[2.2.1]heptane (368 g). The brown gum is obtained in 93% yield (606.4 g) and has a purity (determined by titration against sodium hydroxide) of 91%. IR (squash): 2300–3600 cm$^{-1}$ (broad OH); 1660–1760 cm$^{-1}$ (C=O ester, acid, ketone). NMR (DMSO-d$_6$): 1.0 (s-12H); 1.1–1.8 (m-16H); 4.3–4.4 (m-4H); 5.0 (t-2H); 5.5–6.5 (s-2H); 7.4–8.1 (m-6H)δ.

EXAMPLE 23

Preparation of Di-2,5-dimethoxybenzyl Esters of 3,3′,4,4′-Benzophenonetetracarboxylic Acid The reaction procedure of Example 16 is repeated, replacing the benzyl alcohol by 2,5-dimethoxybenzyl alcohol (336 g). The brown gum is obtained in 79% yield (508 g) and has a purity (determined by titration against sodium hydroxide) of 99.7%. IR (squash): 2500–3400 cm$^{-1}$ (broad OH); 1660–1750 cm$^{-1}$ (C=O ester, acid, ketone). NMR (DMSO-d$_6$): 3.8 (s-12H); 4.8–5.3 (q-4H); 6.8–7.5 (m-12H); 7.6–8.9 (broad s-2H)δ.

EXAMPLE 24

Preparation of Di-2-nitrobenzyl Esters of 3,3′,4,4′-Benzophenonetetracarboxylic Acid The reaction procedure of Example 16 is repeated, replacing the benzyl alcohol by 2-nitrobenzyl alcohol (306 g). The brown gum is isolated in 99% yield (621.7 g) and has a purity (determined by titration against sodium hydroxide) of 91%. IR (squash): 2200–3700 cm$^{-1}$ (broad OH); 1660–1760 cm$^{-1}$ (C=O ester, acid, ketone). NMR (DMSO-d$_6$): 5.7 (s-4H); 7.5–8.2 (m-14H); 5.0–10.0 (broad s-2H)δ.

EXAMPLE 25

Preparation of Di-2-chlorobenzyl Esters of 3,3′,4,4′-Benzophenonetetracarboxylic Acid The reaction procedure described in Example 16 is repeated, replacing the benzyl alcohol by 2-chlorobenzyl alcohol (286 g). The brown gum is obtained in 99% yield (600.9 g) and has a purity (determined by titration against sodium hydroxide) of 94.8%. IR (squash): 2200–3500 cm$^{-1}$ (broad OH); 1660–1760 cm$^{-1}$ (C=O ester, acid, ketone). NMR (DMSO-d$_6$): 5.65 (s-4H); 7.5–8.4 (m-14H); 5.0–9.1 (broad s-2H)δ.

EXAMPLE 26

Preparation of Di-4-hydroxy-3-methoxybenzyl Esters of 3,3′,4,4′-Benzophenonetetracarboxylic Acid The reaction procedure of Example 16 is repeated, replacing the benzyl alcohol by 4-hydroxy-3-methoxybenzyl alcohol (308 g). The brown gum is obtained in 99% yield (623.7 g) and has a purity (determined by titration against sodium hydroxide) of 95.1%. IR (squash): 2200–3600 cm$^{-1}$ (broad OH); 1660–1750 cm$^{-1}$ (C=O ester, acid, ketone). NMR (DMSO-d$_6$): 3.7–3.8 (d-10H); 6.0–7.2 (s-2H); 7.5–8.1 (m-12H); 8.0–9.3 (s-2H)δ.

EXAMPLE 27

Preparation of Di-2-pyridylmethyl Esters of 3,3′,4,4′-Benzophenonetetracarboxylic Acid The reaction procedure of Example 16 is repeated, replacing the benzyl alcohol by 2-methylolpyridine (218 g). The brown gum is obtained in 98% yield (515.5 g) and has a purity (determined by titration against sodium hydroxide) of 66%. IR (squash): 3200–3600 cm$^{-1}$ (NH+); 1660–1750 cm$^{-1}$ (C=O ester, acid, ketone). NMR (DMSO-d$_6$): 3.7–3.9 (d-2H); 5.4 (s-4H); 7.2–8.7 (m-16H)δ.

EXAMPLE 28

Preparation of Di-2-thiophenylmethyl Esters of 3,3′,4,4′-Benzophenonetetracarboxylic Acid The reaction procedure of Example 16 is repeated, replacing the benzyl alcohol by 2-methylolthiophene. The brown gum is obtained in 99% yield (544.5 g) and has a purity (determined by titration against sodium hydroxide) of 101%. IR (squash): 2200–3600 cm$^{-1}$ (broad OH); 1660–1750 cm$^{-1}$ (C=O ester, acid, ketone). NMR (DMSO-d$_6$): 5.1–5.2 (d-4H); 6.8–7.5 (m-12H); 7.7–8.3 (s-2H)δ.

EXAMPLE 29

Preparation of Dibenzyl Esters of Pyromellitic Acid

To pyromellitic dianhydride (218 g, 1 mole) is added dry methyl ethyl ketone (250 ml), N,N-dimethylbenzylamine (4.3 g) and benzyl alcohol (216 g). The mixture is heated to 80° C. and stirred at this temperature for 2 hours. The solvent is then removed under vacuum to give a white gum in 99.5% yield (431.8 g). IR (KBr disc): 2200–3600 cm$^{-1}$ (broad OH); 1690–1740 cm$^{-1}$ (C=O ester, acid). NMR (DMSO-d$_6$): 5.3 (s-4H); 7.2–8.1 (m-12H); 8.0–11.4 (s-2H)δ.

EXAMPLE 30

Preparation of Dibenzyl Esters of Bis(3,4-dicarboxyphenyl)methane

To bis(3,4-dicarboxyphenyl)methane dianhydride (319 g, 1 mole) is added dry methyl ethyl ketone (250 ml), N,N-dimethylbenzylamine (5.4 g) and benzyl alcohol (216 g). The mixture is heated to 80° C. and stirred at this temperature for 4 hours. The solvent is removed under vacuum to give a 98% yield (513.5 g) of a brown gum having a purity (determined by titration against sodium hydroxide) of 86.2%. IR (KBr disc): 2400–3600 cm$^{-1}$ (broad OH); 1700–1760 cm$^{-1}$ (C=O ester, acid).

EXAMPLE 31

To a portion of the partial ester product of Example 1 (10.84 g) is added a portion of the partial ester product of Example 16 (22.18 g), bis(4-aminophenyl)methane (12.08 g), boron trifluoride:ethylamine complex (2.88 g) and acetone (400 ml). The mixture is stirred until a solution is obtained. This solution is used to impregnate a woven carbon fibre mat to give, after evaporation of the acetone, a prepreg having a resin content of 50%. Eight pieces of the prepreg, each measuring 24 mm × 16 mm, are pressed together under a pressure of 0.7 MN/m$^2$ and heated, firstly at a rate of 3° C./min to 205° C., secondly at 205° C. for 2 hours, thirdly to 288° C. at a rate of 3° C./min and lastly at 288° C. for 1 hour, to form a cured 8-ply laminate. The laminate is post-cured by heating to 215° C. over 8 hours, maintaining at 215°

13

C. for 7 hours, heating to 240° C. over 4 hours, maintaining at 240° C. for 8 hours, heating to 315° C. over 9 hours and maintaining at 315° C. for 13 hours. The glass transition temperature (Tg) of the resulting laminate as determined by Dynamic Mechnical Thermal Analysis is 340° C. The laminate has a low void content.

EXAMPLE 32

Example 31 is repeated, replacing the partial ester product of Example 1 by the partial ester product of Example 3 (10.74 g), replacing the partial ester product of Example 16 by the partial ester product of Example 18 (22.08 g) and adjusting the amount of bis(4-aminophenyl)methane to 12.30 g. The resulting laminate has a Tg, determined as in Example 31, of 260° C. and has a low void content.

EXAMPLE 33

Example 31 is repeated, replacing the partial ester product of Example 1 by the partial ester product of Example 4 (10.86 g), replacing the partial ester product of Example 16 by the partial ester product of Example 19 (22.34 g) and adjusting the amount of bis(4-aminophenyl)methane to 11.92 g. The resulting laminate has a Tg, determined as in Example 31, of 242° C. and has few voids.

EXAMPLE 34

Example 31 is repeated, replacing the partial ester product of Example 1 by the partial ester product of Example 6 (10.94 g), replacing the partial ester product of Example 16 by the partial ester product of Example 21 (22.54 g) and adjusting the amount of bis(4-aminophenyl)methane to 11.63 g. The resulting laminate has a Tg, determined as in Example 31, of 310° C. and has few voids.

EXAMPLE 35

Example 31 is repeated, replacing the partial ester product of Example 1 by the partial ester product of Example 9 (11.22 g), replacing the partial ester product of Example 16 by the partial ester product of Example 24 (23.11 g) and adjusting the amount of bis(4-aminophenyl)methane to 10.79 g. The resulting laminate has a Tg, determined as in Example 31, of 340° C. and has few voids.

EXAMPLE 36

Example 31 is repeated, replacing the partial ester product of Example 1 by the partial ester product of Example 13 (10.86 g), replacing the partial ester product of Example 16 by the partial ester product of Example 28 (22.35 g) and adjusting the amount of bis(4-aminophenyl)methane to 11.91 g. The resulting laminate has a Tg, determined as in Example 31, of 300° C. and has a low void content.

EXAMPLE 37

Example 31 is repeated, replacing the partial ester product of Example 1 by the partial ester product of Example 14 (8.67 g), increasing the amount of the partial ester product of Example 16 to 23.61 g and adjusting the amount of bis(4-aminophenyl)methane to 12.84 g. The resulting laminate has a Tg, determined as in Example 31, of 320° C. and has a low void content.

EXAMPLE 38

Example 31 is repeated, replacing the partial ester product of Example 1 by the partial ester product of Example 15 (12.01 g), reducing the amount of the partial ester product of Example 16 to 21.44 g and adjusting the amount of bis(4-aminophenyl)methane to 11.66 g. The resulting laminate has a Tg, determined as in Example 31, of 330° C. and has a low void content.

EXAMPLE 39

Example 31 is repeated, increasing the amount of the partial ester product of Example 1 to 12.12 g, replacing the partial ester product of Example 16 by the partial ester product of Example 29 (19.50 g) and adjusting the amount of bis(4-aminophenyl)methane to 13.48 g. The resulting laminate has a Tg, determined as in Example 31, of 295° C. and has a low void content.

EXAMPLE 40

Example 31 is repeated, reducing the amount of the partial ester product of Example 1 to 10.82 g, reducing the amount of the partial ester product of Example 16 to 22.14 g and replacing the bis(4-aminophenyl)methane by bis(4-aminophenyl)ether (12.16 g). The resulting laminate has a Tg, determined as in Example 31, of 280° C. and has a low void content.

EXAMPLE 41

Example 31 is repeated, reducing the amount of the partial ester product of Example 1 to 10.79 g, reducing the amount of the partial ester product of Example 16 to 22.08 g and replacing the bis(4-aminophenyl)methane by 3-(4-aminobenzyl)-4,4'-diaminodiphenylmethane (12.25 g). The resulting laminate has a Tg, determined as in Example 31, of 320° C. and has few voids.

EXAMPLE 42

Example 31 is repeated, increasing the amount of the partial ester product of Example 1 to 11.20 g, increasing the amount of the partial ester product of Example 16 to 22.91 g and replacing the bis(4-aminophenyl)methane by an aniline-formaldehyde condensation residue (10.98 g). The resulting laminate has a Tg, determined as in Example 31, of 300° C. and has few voids.

What is claimed is:

1. A polyimide-forming composition comprising
(A) a polycarboxylic acid partial ester of formula

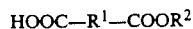
$$HOOC-R^1-COOR^2 \quad \text{I}$$

where $R^1$ denotes a divalent ethylenically unsaturated aliphatic or cycloaliphatic group of 2 to 20 carbon atoms, and $R^2$ denotes the residue, after removal of a hydroxyl group, of an alcohol having from 4 to 20 carbon atoms which has a cycloaliphatie, aromatic or heterocyclic ring and is polymerisable on heating in the presence of an acid, (B) a partial ester of formula I above in which $R^1$ denotes a group of formula II

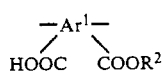
$$\begin{array}{c} -Ar^1- \\ / \quad \backslash \\ HOOC \quad COOR^2 \end{array} \quad \text{II}$$

where $Ar^1$ denotes a tetravalent aromatic group of 6 to 20 carbon atoms linked through aromatic carbon atoms thereof to the indicated carbon atoms, and $R^2$ is as defined above, (C) an aromatic primary polyamine and (D) a heat-activable substance which releases an acid at a temperature of 100° C. or above.

2. A composition according to claim 1, in which, in (A), $R^1$ denotes a group of formula $$-C(R^3)=C(R^3)- \qquad III$$

or

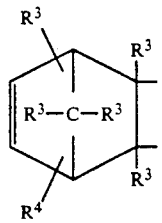   IV where $R^3$ denotes a hydrogen atom or an alkyl group of 1 to 4 carbon atoms, and $R^4$ denotes a hydrogen atom, an alkyl group of 1 to 4 carbon atoms, an allyl group or a methallyl group.

3. A composition according to claim 1, in which, in (B), $R^1$ denotes a group of formula II where $Ar^1$ denotes the residue, after removal of 4 carboxyl groups, of a benzophenone tetracarboxylic acid, a benzene tetracarboxylic acid or a bis(dicarboxyphenyl)alkane.

4. A composition according to claim 1, in which $R^2$ denotes the residue, after removal of an alcoholic hydroxy group, of an alcohol of formula $$R^5CH_2OH \qquad V$$

where $R^5$ denotes a monovalent aromatic group of 6 to 15 carbon atoms, linked through an aromatic carbon atom thereof to the indicated carbon atom, or a monovalent heterocyclic group having a nitrogen, oxygen or sulphur hetero atom, having 4 to 6 atoms in the ring and having a ring carbon atom thereof attached to the indicated carbon atom, or a monovalent ethylenically unsaturated cycloaliphatic group of 5 to 15 carbon atoms having a ring carbon atom thereof attached to the indicated carbon atom, or a group of formula $$-CH=C(R^6)R^7 \qquad VI$$

where either $R^6$ denotes a hydrogen atom and $R^7$ denotes a monovalent aromatic group of 6 to 15 carbon atoms having an aromatic carbon atom attached to the indicated carbon atom, or $R^6$ and $R^7$ together with the carbon atom to which they are attached denote a divalent cycloaliphatic group of 5 to 15 carbon atoms.

5. A composition according to claim 4, in which $R^5$ denotes a phenyl group which is unsubstituted or substituted by $C_1$-$C_4$ alkyl, $C_1$-$C_4$ alkoxy, hydroxyl, halogen or nitro.

6. A composition according to claim 5, in which $R^5$ denotes a phenyl group which is unsubstituted or substituted by two methoxy groups, or by one methoxy and one hydroxyl group, or by one chlorine atom or one nitro group.

7. A composition according to claim 4, in which $R^5$ denotes a heterocyclic group having one oxygen atom and 3 to 5 carbon atoms in the ring, or a heterocyclic group having one sulphur atom and 4 carbon atoms in the ring, or a heterocyclic group having one nitrogen atom and 5 carbon atoms in the ring.

8. A composition according to claim 7, in which $R^5$ denotes an oxetanyl, furyl, dihydropyranyl, thiophenyl or pyridinyl group.

9. A composition according to claim 4, in which $R^5$ denotes a cycloalkenyl group having 5 to 10 carbon atoms.

10. A composition according to claim 9, in which $R^5$ denotes a bicycloheptenyl group.

11. A composition according to claim 4, in which $R^5$ denotes a group of formula VI where $R^6$ denotes a hydrogen atom and $R^7$ denotes an aromatic group of 6 to 10 carbon atoms.

12. A composition according to claim 11, in which $R^5$ denotes a cinnamyl group.

13. A composition according to claim 4, in which $R^5$ denotes a group of formula VI where $R^6$ and $R^7$ together with the carbon atom to which they are attached denote a divalent saturated cycloaliphatic group of 5 to 10 carbon atoms.

14. A composition according to claim 13, in which $R^6$ and $R^7$ together with the carbon atom to which they are attached denote a bicycloheptylidene group.

15. A composition according to claim 1, in which the aromatic polyamine (C) has 2 or 3 primary amine groups or is an aniline-formaldehyde condensate having more than 3 primary amine groups.

16. A composition according to claim 15, in which the aromatic polyamine (C) is a phenylenediamine, a diaminopyridine, a phenylindane diamine, a diaminoxanthene, an aniline-formaldehyde condensate having 3 or more primary amine groups, or a diamine of formula $$H_2N-Ar^2-X-Ar^2-NH_2 \qquad X$$

where $Ar^2$ denotes a phenylene group and

X denotes an alkylene group of 1 to 4 carbon atoms, an oxygen atom or a carbonyl or sulphonyl group.

17. A composition according to claim 1, in which the heat-activatable substance (D) is a boron trifluoride complex.

18. A composition according to claim 17, in which (D) is a boron trifluoride-primary amine complex.

19. A composition according to claim 1, in which the molar ratio A:B:C is within the range 1:0.7–1.3:1.2–1.8.

20. A composition according to claim 1, which also contains a fibrous reinforcing material, said composition being in the form of a prepreg.

21. A composition according to claim 1, cured by heating.

22. A composition according to claim 21, cured by heating in two stages, firstly at 120° C.–220° C. to effect polyimide formation and then at 250° C. or above to effect crosslinking through unsaturated groups derived from partial ester (A).

* * * * *